A. C. McGEE.
OXYGEN GENERATOR.
APPLICATION FILED JULY 17, 1911. RENEWED DEC. 2, 1912.
1,066,743.
Patented July 8, 1913.
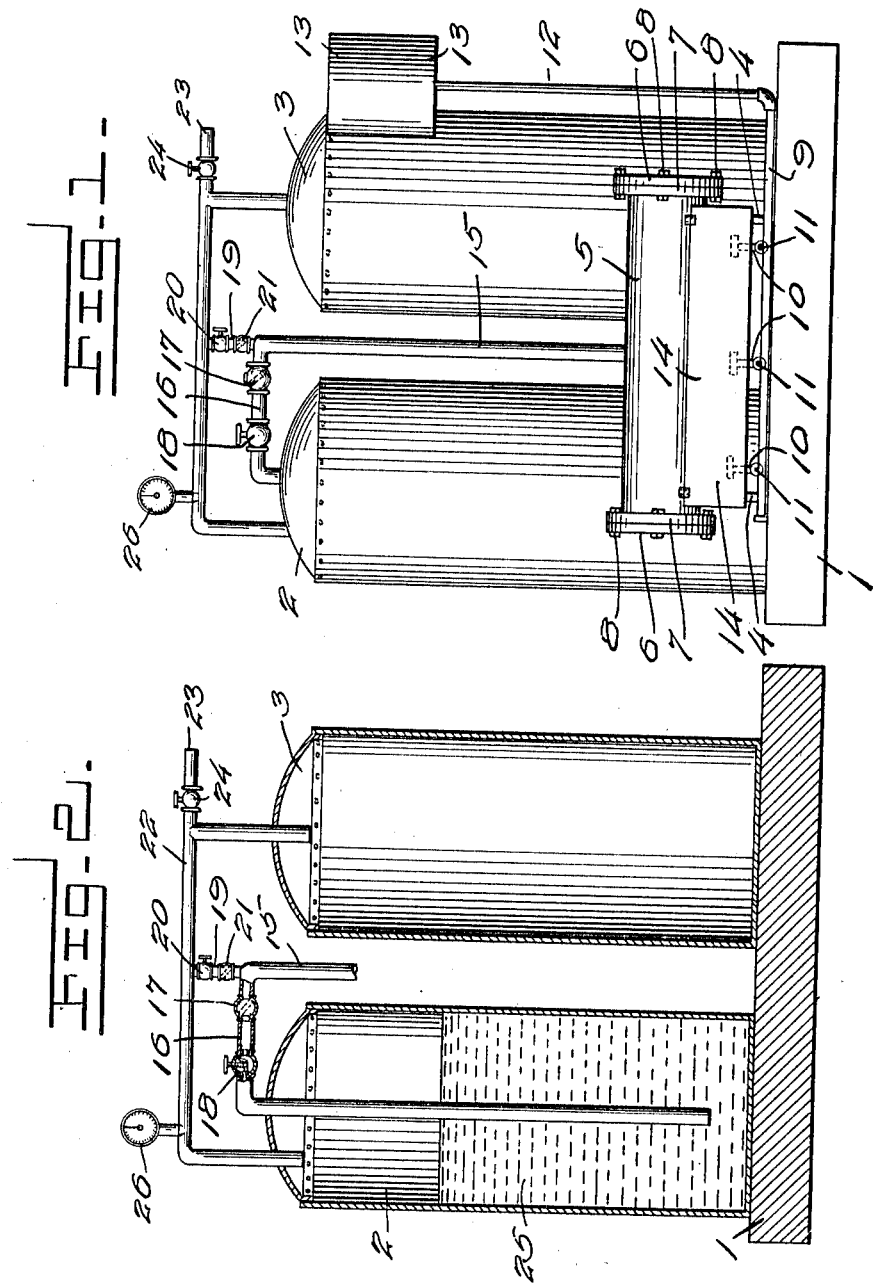
Witnesses
Inventor
A. C. McGee,
By Harry Ellis Chandler
Attorney

UNITED STATES PATENT OFFICE.

ARTHUR C. McGEE, OF OLATHE, KANSAS, ASSIGNOR, BY MESNE ASSIGNMENTS, TO ECONOMY WELDING MACHINE COMPANY, OF KANSAS CITY, MISSOURI, A CORPORATION OF MISSOURI.

OXYGEN-GENERATOR.

1,066,743.

Specification of Letters Patent.

Patented July 8, 1913.

Application filed July 17, 1911, Serial No. 638,891. Renewed December 2, 1912. Serial No. 734,625.

*To all whom it may concern:*

Be it known that I, ARTHUR C. McGEE, a citizen of the United States, residing at Olathe, in the county of Johnson and State of Kansas, have invented certain new and useful Improvements in Oxygen-Generators, of which the following is a specification.

My invention relates to improvements in oxygen generators, and has for its leading object the provision of an improved form of generator by the use of which the oxygen generated may be thoroughly purified before passing into the service pipe for use.

The further object of my invention is the provision of an improved form of oxygen generator which will automatically operate to prevent the purifying solution from passing into the generating retort and which will thus prevent destruction of the apparatus which would occur were not some means provided for preventing the fluid from entering the retort, and which is liable to occur when said means are manually instead of automatically controlled.

Other objects and advantages of my improved oxygen generator will be readily apparent by reference to the following description taken in connection with the accompanying drawings, and it will be understood that I may make any modifications in the specific structure shown and described within the scope of my claim without departing from or exceeding the spirit of my invention.

Figure 1 represents a side elevation of my improved oxygen generator, and Fig. 2 represents a vertical sectional view of the same.

In the drawings, the numeral 1 designates the supporting base of my oxygen generator having mounted thereon the purifying or filtering tank 2 and the storage tank 3, while secured to and rising from the base are the supporting brackets 4 on which is secured the generating tank 5. Said tank 5 has the heads or cap plates 6 removably secured to its end flanges 7 by the clamp bolts 8, to fill the retort it being necessary to remove one of the ends or heads of the retort.

In order to heat the retort 5 to cause the generation of oxygen from the chemical charge inserted in the retort, I place along the base 1 beneath the retort the pipe 9 having extending upward therefrom the burners 10 controlled by the valves 11, said pipe having an upwardly extending portion 12 bearing the gasolene tank 13 for supplying fuel to the burners. To cause the heat to be directed against the retort and prevent spreading of said heat, I preferably hinge to the side of the retort the flap 14 which drops down against the bracket as is clearly shown in Fig. 1.

Extending upward from the retort 5 is a pipe 15 having a portion 16 extending laterally therefrom and down nearly to the bottom of the tank 2, said pipe 16 having inserted therein the automatic check valve 17 and the ordinary controlling valve 18, the check valve permitting of flow from the pipe 15 through the pipe 16 into the tank but preventing retrograde flow into the retort. Extending directly upward from the pipe 15 is a connecting pipe 19 containing a controlling valve 20 and a check valve 21 disposed to permit of downward flow through the pipe 19. Said pipe 19 empties into the U-shaped pipe 22 which connects the tops of the tanks 2 and 3, said pipe 22 having extending therefrom the service pipe 23 controlled by a valve 24.

In the use of my oxygen generator, the fire having been started I open the valve 20 to allow any gas under pressure contained in either of the tanks to pass into the pipe 15 and the retort. I then open the valve 18 to permit the gas as generated in the retort to pass into the tank 2 at the bottom thereof. Said tank 2 is about two-thirds filled with a suitable filtering or purifying fluid 25 through which the oxygen passes upward to the upper portion of the tank and thence through the pipe 22 either to the service pipe 23 or to the storage tank 3. After the full amount of gas has been generated in the retort the pressure therein will drop. Ordinarily this would suck a portion of the purifying fluid into the retort, but the check valve 17 prevents passage of the fluid into the retort while the check valve 21 compensates for the dropping of the pressure by allowing sufficient pressure to pass from the pipe 22 down the pipe 15 to the retort to compensate for the drop of pressure in the retort. In order that I may at all times know the exact amount of pressure, I preferably mount on the pipe 22 a gage glass 26 for indicating the same.

From the foregoing description taken in connection with the accompanying drawings the construction and use of my improved oxygen generator will be readily seen and it will be apparent that I have provided a thoroughly simple, efficient practical and durable oxygen generator which will automatically control the distribution of pressure in the various parts of the generator and which will have a maximum degree of safety.

I claim:

An oxygen generator, including a retort, a tank having a pipe discharging from the retort into the lower portion of said tank, said tank being partially filled with a purifying fluid, a check valve in said pipe to allow gas to pass from the retort into the tank and through the fluid, but preventing the fluid from passing from the tank to the retort, a pipe extending from the top of the tank to the pipe from the bottom of the tank, and a check valve for preventing gas from the retort entering the tank except through the fluid but allowing gas from the top of the tank to pass said check valve and enter the retort pipe.

In testimony whereof I affix my signature, in the presence of two witnesses.

ARTHUR C. McGEE.

Witnesses:
A. L. HAYES,
W. E. PAYNE.

---

Copies of this patent may be obtained for five cents each, by addressing the "Commissioner of Patents, Washington, D. C."